United States Patent
Muhr

(12) 
(10) Patent No.: US 6,269,852 B1
(45) Date of Patent: Aug. 7, 2001

(54) LOADER WITH SEAL COLLAR

(76) Inventor: Roland Muhr, Biberstrasse 41 a, D-83098 Brannenburg (DE)

( * ) Notice: Subject to any disclaimer, the term of this patent is extended or adjusted under 35 U.S.C. 154(b) by 0 days.

(21) Appl. No.: 09/340,527

(22) Filed: Jun. 28, 1999

(30) Foreign Application Priority Data

Apr. 8, 1999 (DE) .............................. 199 15 727
Apr. 8, 1999 (DE) .............................. 199 15 725

(51) Int. Cl.[7] .................. B65B 1/04; B65B 3/04; B67C 3/00
(52) U.S. Cl. .............. 141/287; 141/59; 141/65; 141/263; 141/275; 141/276; 141/285; 141/287; 141/311 R
(58) Field of Search .................. 141/59, 65, 67, 141/68, 251, 256, 263, 275, 276, 285, 287, 311 R

(56) References Cited

U.S. PATENT DOCUMENTS

| | | | |
|---|---|---|---|
| 3,799,223 | * | 3/1974 | Feneziani ........................ 141/388 |
| 3,958,700 | * | 5/1976 | Foy et al. ........................ 141/287 |
| 4,703,782 | * | 11/1987 | Henkel, Sr. ...................... 141/65 |
| 4,872,493 | * | 10/1989 | Everman ......................... 141/59 |

* cited by examiner

*Primary Examiner*—Timothy L. Maust
(74) *Attorney, Agent, or Firm*—Domingue & Waddell, PLC

(57) ABSTRACT

A loader for filling tank-shaped containers (1) with bulk material, which includes at least one loading nozzle (2), at least one loading bellows (3), in one piece or several pieces, connecting to the said loading nozzle (2) and at least one adjustment element (4) whose purpose is to adjust the said loading nozzle (2) vertically, horizontally or transversally, whereby the contact area of the said loading nozzle (2) that can be brought to connect with the loading opening takes the form substantially of a pneumatically or hydraulically inflatable seal collar (9) and the said loading bellows (3) is connected directly or indirectly to a device (5) whose purpose is to stretch the walls of the said loading bellows (3) and whereby the said loader includes or does not include a filter unit (12) whose purpose is to filter the gaseous medium forced out of the said tank-shaped container (1) through the bulk material and includes or does not include an outgoing air recirculation system (16) for recirculating the gaseous medium forced out of the said tank-shaped container (1) through the bulk material back into the silo (17) being emptied.

17 Claims, 5 Drawing Sheets

LOADER WITH SEAL COLLAR

The invention in question concerns a loader for filling tank-shaped containers (1) with bulk material with the characteristics described in the characterising clause of patent claim 1.

A loader is known to the state of the art that lays loading nozzles situated downstream loose on the opening of the tank-shaped container to be filled.

A loader of this kind has the particular drawback of considerable loss of dust through the gap between the opening of the container and the loading nozzle.

This loss of dust can lead to significant environmental pollution, to risks to the health of the operating staff and to a deterioration in safety in the workplace.

One further disadvantage of a loader of this kind consists of the fact that residues of the bulk material in dust form often accumulate in the nozzle clearance area between the loading opening of the tank-shaped container and the loading nozzle. This is especially serious, in particular from the standpoint of significant cleaning costs and in terms of hygiene and ascertaining quality.

A loader with a loading bellows is also known to the state of the art.

After the loading bellows has let the bulk material out, residues of the bulk material often remain caught in its side pleats, especially when the bulk material is in powder or dust form.

These bulk material residues in the pleats of the loading bellows are particularly serious from a point of view of hygiene in the case of foodstuffs. The formation of mould, fungal attacks and decomposition with alteration of flavour often result.

In the case of avidly reactive materials, there is moreover the danger of ignition or explosion if the residues in the pleats of the loading bellows come into contact with the oxygen in the air.

In addition to this, hygroscopic bulk material may result in the formation of a glutinant oily residue that is difficult to remove.

In the case of a change in production, the bulk material residues caught in the pleats of the loading bellows often lead to impurities in the new product. When differently colored color dusts or chemically mutually reactive materials are loaded, this is a great disadvantage.

In order to dedust a very small proportion of the bulk material residue from the loading fittings, the loading equipment according to the state of the art uses for example a vibrator, which is employed on the loading nozzles provided downstream from the loading bellows at the connection to the loading process.

However, the use of a vibrator at the loading nozzles leads to the serious disadvantage that large amounts of bulk material residue remain inside the loading fittings, especially in the side pleats of the loading bellows.

The task of the invention in question is thus to provide a loader for filling tank-shaped containers with bulk material that does not suffer from the problem of a loss of dust through the gap between the loading opening of the container to be filled and the loading nozzle and which enables the loading fittings, especially the side pleats of the loading bellows, to be dedusted practically entirely, so as to leave no bulk material residues, with a simple construction and in an economic manner.

According to the invention, this task is undertaken with a generically suitable device by means of the characteristics described in the characterizing part of Patent claim 1.

Particularly preferable embodiments are the subject of the subsequent claims.

Embodiments of the invention are described more fully with the aid of the illustrations. These show:

FIG. 1: a schematic cross-section through a loader according to the invention with a device for stretching the loading bellows;

FIG. 2: a schematic cross-section through a loader according to the invention with a filter unit built into the loading bellows for cleaning the outgoing air passing out of the container to be filled through the filled bulk material;

FIG. 3: a schematic cross-section, with a portion in detail, through a downstream loading nozzle with an inflatable surrounding seal collar;

FIG. 4: a schematic side view of a device according to the invention with a system for recirculating the outgoing air back into the silo situated above;

FIG. 5: a cross-section through a loader according to the invention with an air recirculation system as illustrated in FIG. 4;

FIG. 6: a schematic cross-section through a loader according to the invention with telescopically retractable loading tubes and intervening seal collars.

As is already evident from FIG. 1, the loader according to the invention for filling tank-shaped containers (1) with bulk material usually includes at least one loading nozzle (2) with one or more outlet openings, at least one single-piece or multi-piece loading bellows (3) connecting directly or indirectly upstream of the said loading nozzle (2) and at least one single-piece or multi-piece adjustment element (4) for the substantial vertical and/or horizontal and/or transverse adjustment of the said loading nozzle (2).

One significant characteristic of the loader according to the invention consists of the fact that the area of the loading nozzle (2) that can be brought to connect directly or indirectly with the container opening has the form substantially of a pneumatically or hydraulically inflatable seal collar (9).

In particular, the effect of this characteristic of the seal collar is that the loader according to the invention is not affected by the problem of the always undesirable dust emission from the gap between the loading opening of the container (1) to be filled and the loading nozzle (2). Rather, the connection made there is dust-tight and/or gas-tight.

As an alternative or in addition to this, the loading bellows (3) can be connected indirectly or directly with at least one single-piece or multi-piece device (5) to stretch the side of the loading bellows (3) at least partially or completely and at least in sections or along the entire length of the loading bellows.

By virtue of this device (5) for stretching the pleats of the loading bellows (3), it is possible for the first time to achieve a practically complete dedusting of the loading fittings, especially the side pleats of the loading bellows (3), leaving them free of bulk material residues, with a simple construction and in an economic manner.

To the extent required by the nature of the bulk material, the loader according to the invention can include one or more filter units (12) for filtering the gaseous medium forced out of the tank-shaped container (1) through the bulk material.

FIG. 2 illustrates in particular that for example provision is made for at least one bulk material feed tube (10) within the loading bellows (3) for this purpose.

In preferred embodiments, at least one filter unit (12) made in a single piece or several pieces is situated in the substantially concentric surround area (11) between the loading bellows (3) and the bulk material feed tube (10), for the purpose of filtering the gaseous medium which is forced out of the tank-shaped container (1) through the loaded bulk material.

The gaseous medium containing dust forced out of the tank-shaped container (1) through the bulk material loaded preferably arrives first in the gap between the outer side of the filter unit (12) and the inner side of the loading bellows (3). Subsequently, the gaseous medium can pass through the filter unit (12) before then flowing through the gap between the inner side of the filter unit (12) and the outer side of the bulk material feed tube (10) into the atmosphere, with or without the assistance of suction.

It is of course also possible to array the system in such a way that the flow through the filter unit (12) takes place in the opposite direction.

In particularly preferred embodiments, provision is made for the filter unit (12) in the upper section of the loading bellows (3) to be shaped with the rigid or flexible form of one or more filter cartridges, rigid filtering tubes or flexible filtering hoses.

The loading bellows (3) can have the same diameter throughout its entire height or may be slightly tapered towards the top and/or the bottom.

In order to increase the serviceable life of the filter unit (12), it may be for example constructed in such a way that it can be dedusted by means of a dedusting unit by vibrating and/or pneumatically using the parallel flow or counterflow principle.

If necessary, an aspiration or a suction ventilator may be connected to the clean air outlet of the filter unit (12).

The height of the loading bellows (3) in the retracted condition is normally substantially the same as the height of the filter unit (12). Of course, it is also possible to choose a filter unit (12) whose height is shorter or longer than the height of the loading bellows (3) in the retracted condition.

FIG. 3 shows that the seal collar (9) for achieving a dust-tight closure of the nozzle clearance area between the for example substantially cylindrical part of the loading nozzle (2) and the loading opening of the tank-shaped container (1) consists preferably and substantially of an elastic, reversibly inflatable tube.

This can surround the external side of the loading nozzle (2) either completely or partially.

When deflated, the external diameter of the inflatable seal collar should be preferably at least a little smaller than the diameter of the loading opening of the tank-shaped container (1). When inflated, the diameter of the inflatable seal collar should however be substantially at least equivalent to the diameter of the loading opening.

As FIG. 4 illustrates, the loader according to the invention can include a closed outgoing air recirculation system (16) from the tank-shaped container (1) to be filled to the silo (17) being emptied during the loading process. In preferred embodiments, this outgoing air recirculation system (16) is impermeable to air and/or gas with regard to the atmosphere.

Figure 1:
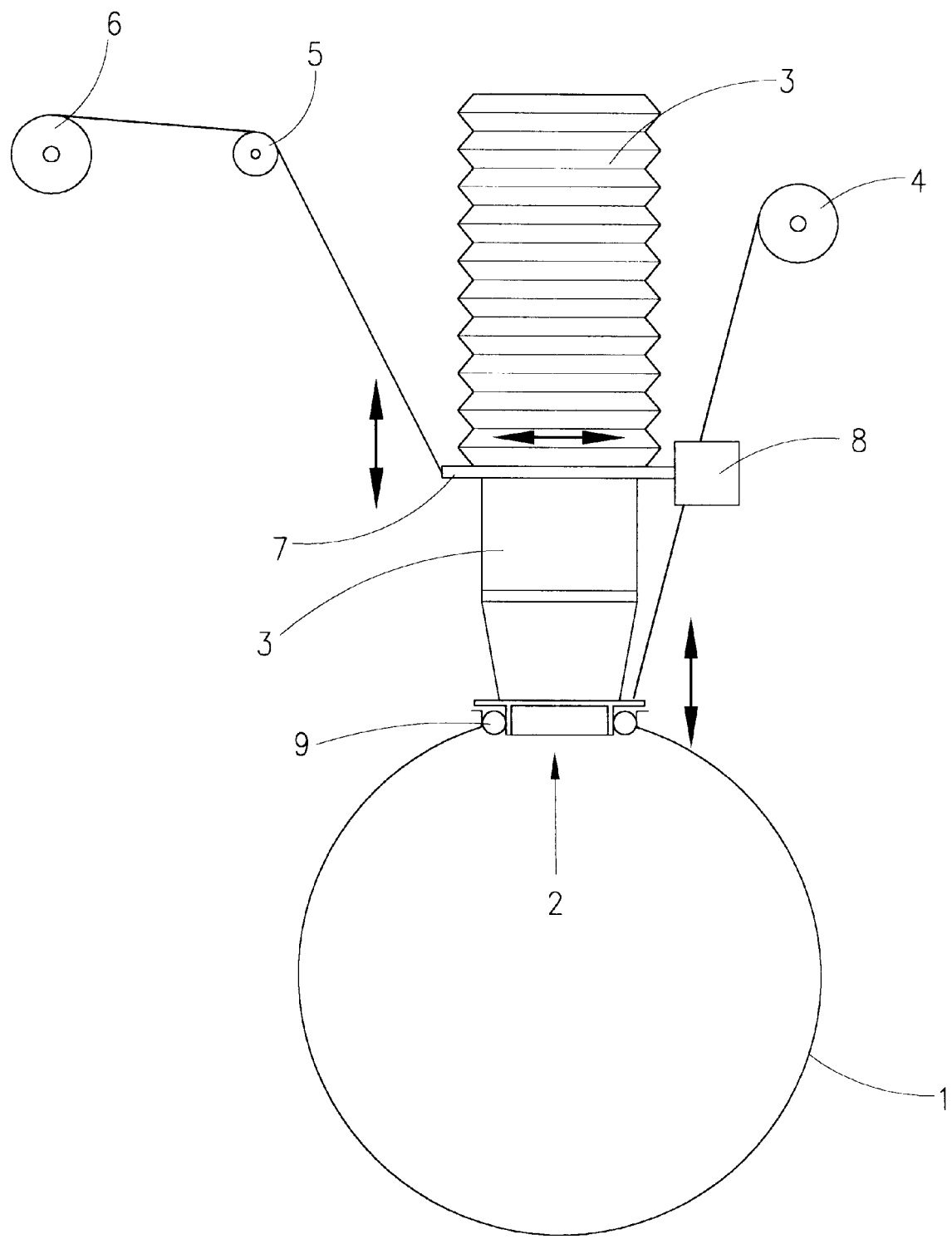
Figure 2:
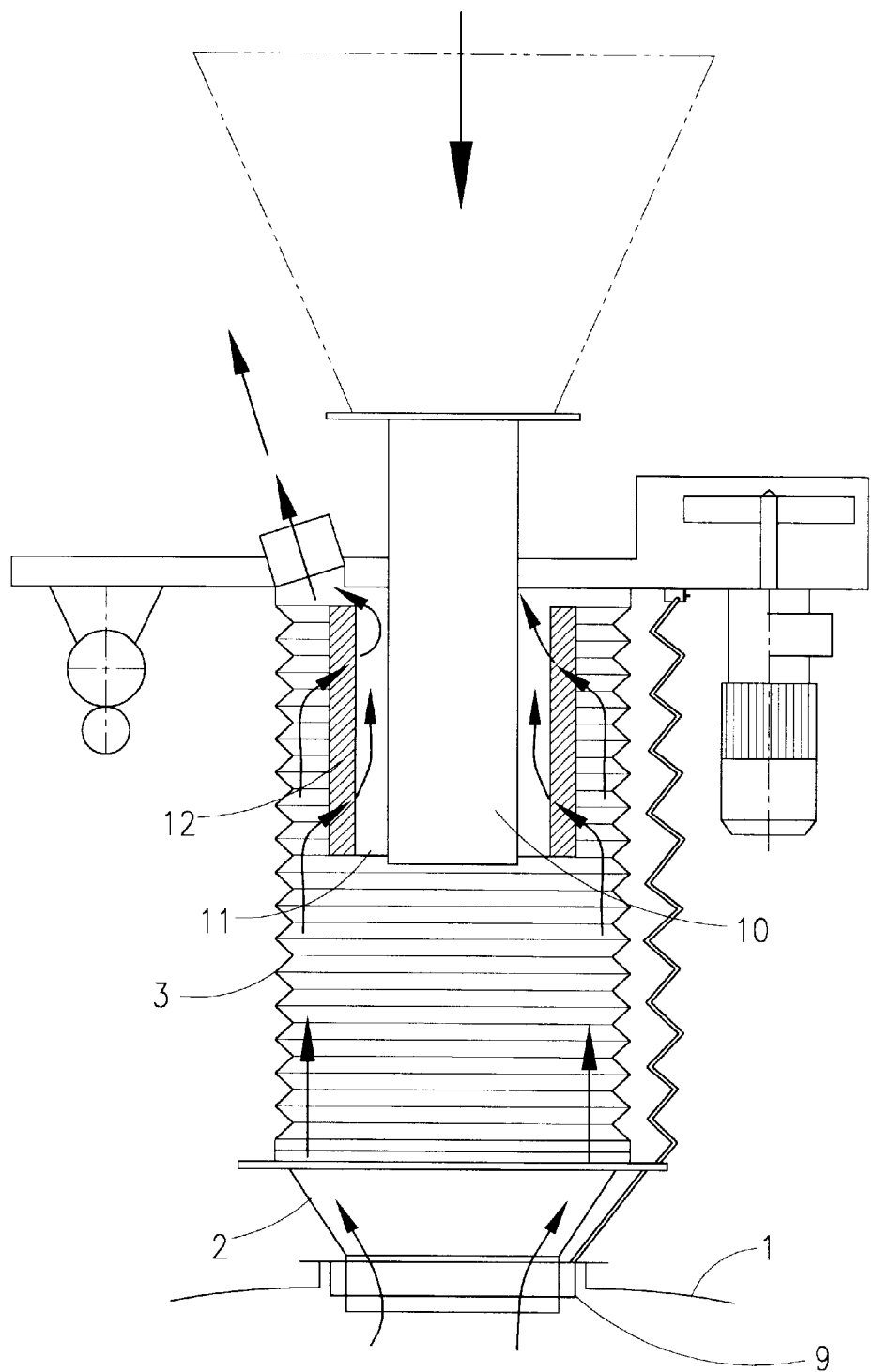
Figure 3:
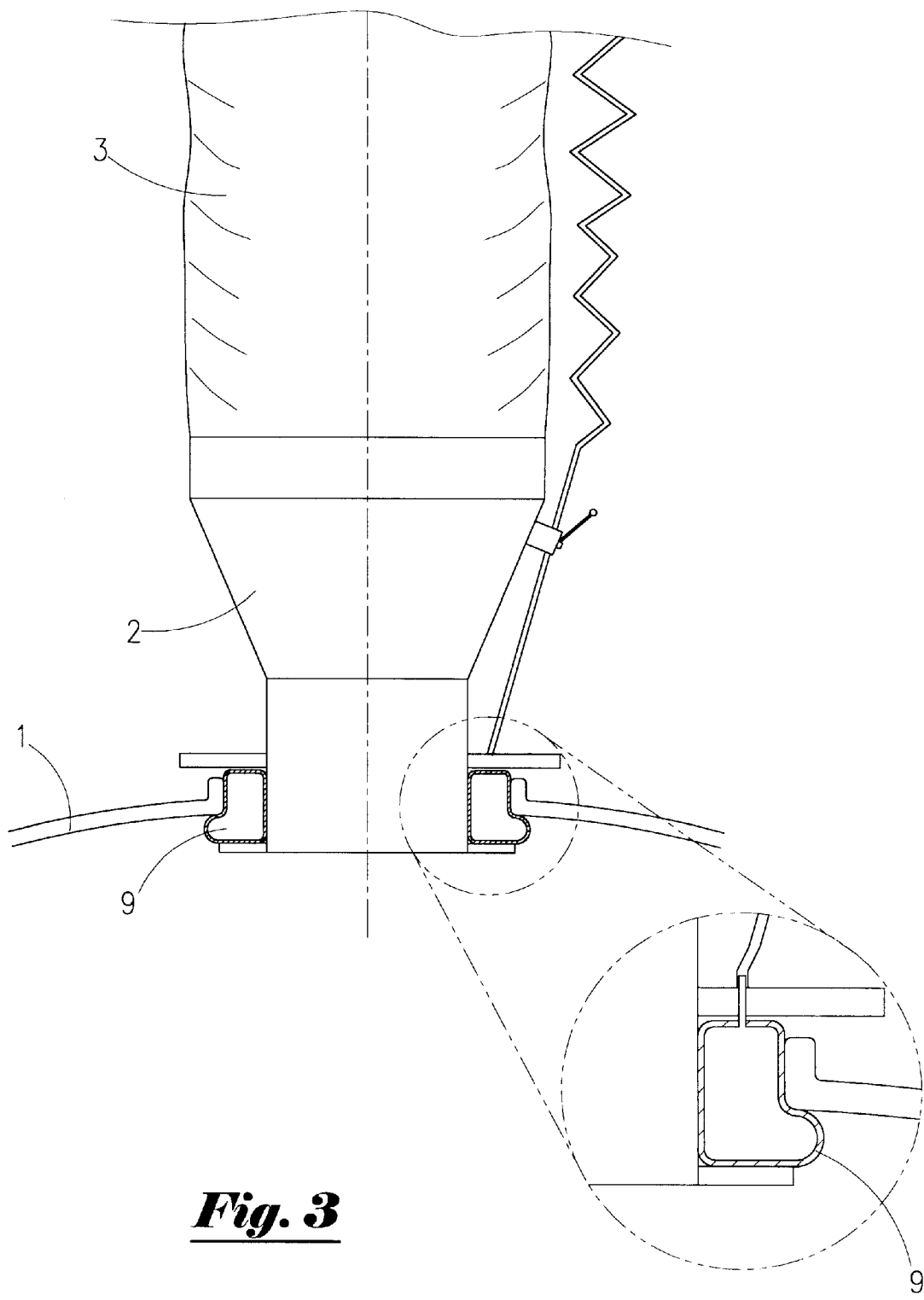
Figure 4:
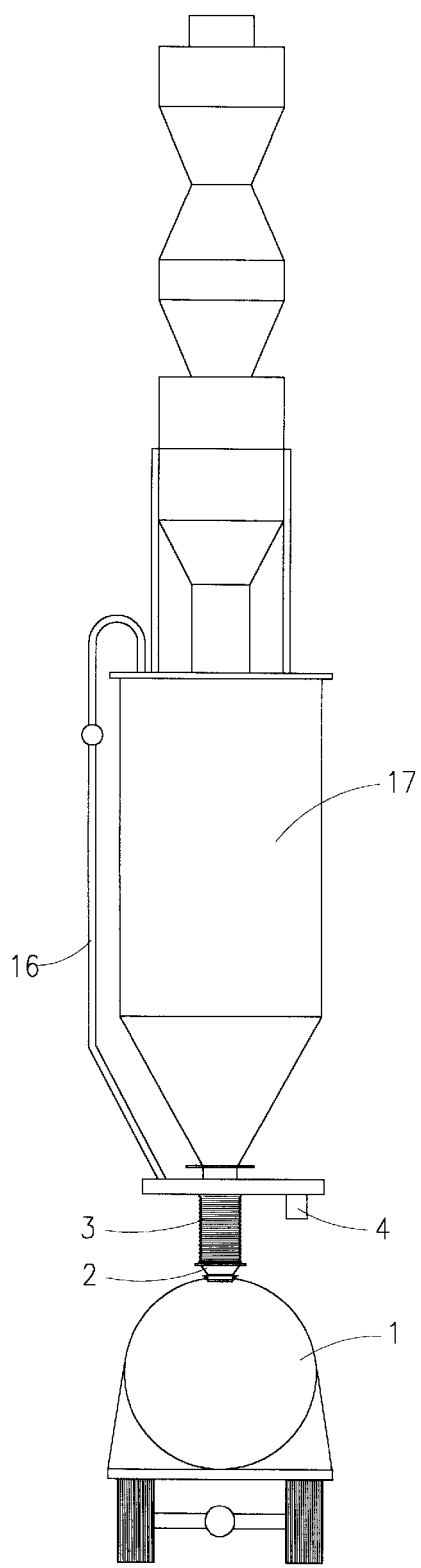
Figure 5:
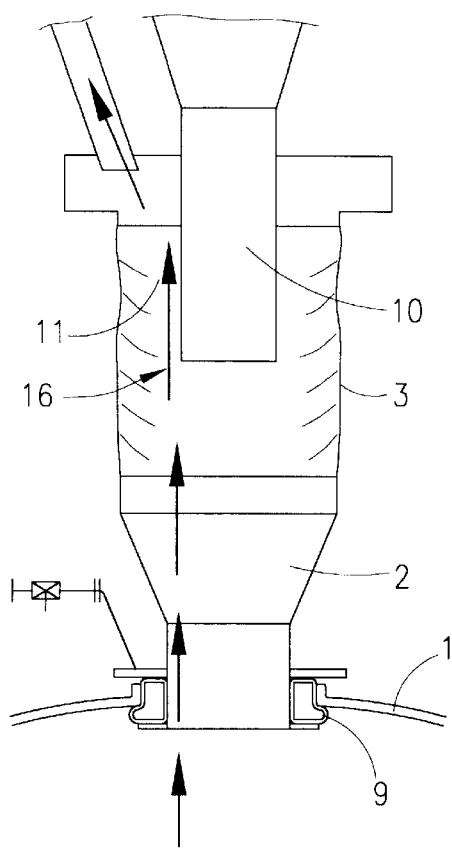
FIG. 5 illustrates an enlarged cross-section through a loader according to the invention with an example of an outgoing air recirculation system (16).
Figure 6:
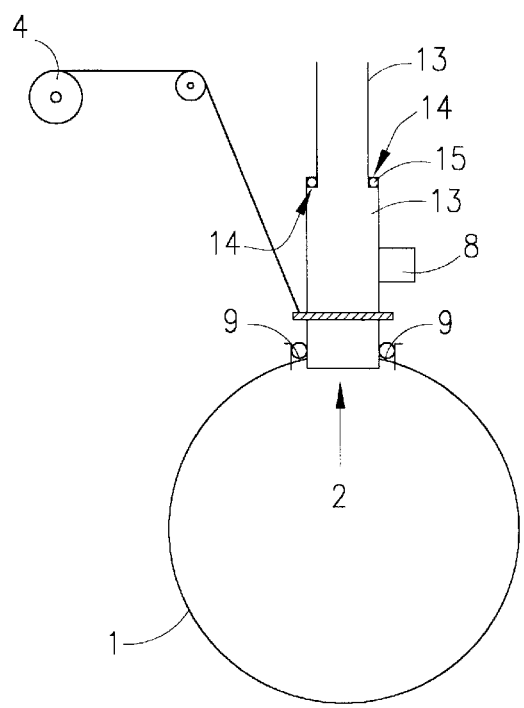
FIG. 6 illustrates that the at least one loading bellows (3) in one or more pieces, connecting upstream to the loading nozzle (2) directly or indirectly, can have the form at least of a single-piece or multi-piece, if necessary retractable, telescopic tube (13).

In particularly preferable embodiments, the nozzle clearance area(s) (14) between the tubes of the telescopic tube (13) can be sealed by at least one single-piece or multi-piece pneumatically and/or hydraulically inflatable seal collar (15).

By providing the said seal collars (15), any dust emission through the said nozzle clearance areas (14) and any dust penetration into the same are effectively avoided.

In order to dedust the loading bellows (3) or the telescopic loading tube (13), one or more drive elements (8) set substantially horizontally and/or transversely, directly or indirectly, can be used, for example applying a shaking, knocking or vibrating movement, at least in sections, on the walls of the said loading bellows (3) or of the said telescopic loading tube (13).

The device (5) illustrated in particular in FIG. 1, which has the purpose of stretching the walls of the loading bellows (3) at least partially and/or at least in sections, usually includes at least one drive element (6), which directly or indirectly affects at least one section of the wall of the loading bellows (3) by reversibly thrusting this section along the longitudinal axis of the loading bellows (3) and/or transversally and/or perpendicular to the same.

For the purpose of stretching the walls of the loading bellows (3) at least partially and/or at least in sections, the said device (5) normally also includes in addition to the at least one drive element (6)—for example for receiving the vibration movements of the drive element (8)—one or more fixture elements (7) in, at or on one or more sections of the said loading bellows (3) or distributed along its entire length.

This at least one fixture element (7) may be a fixture frame substantially adapted or not adapted to the peripheral shape of the said loading bellows (3), a bracket, a substantially hole-shaped opening, a rope guide eyelet applied to the ring-shaped tube reinforcements or a combination of these.

The at least one adjustment element (4) for adjusting in particular the loading nozzle (2) vertically and/or horizontally and/or transversally takes the form for example of an hydraulic or pneumatic lifting cylinder, a spring mechanism, a manually and/or electrically powered tackle line mechanism, a rack and pinion or spindle drive, a lifting system, a leverage system or an eccentric wheel, either without or in combination with counterweights, either alone or in combination with each other.

As an alternative or in addition to this, the at least one drive element (6), whose purpose is to stretch the walls of the loading bellows (3) at least partially and/or at least in sections, and/or the drive element (8), whose purpose is to execute a substantially horizontal and/or transverse shaking, knocking or vibrating motion against the walls of the said loading bellows (3) or the telescopic tube (13), may have the same form.

In particularly preferable embodiments of the loader according to the invention, provision is made for one or more fixture elements (7) for receiving the movements of the at least one drive element (6, 8) in the lower and/or central and/or upper area of the loading bellows (3), so that it is possible to stretch the said loading bellows (3) in sections and/or along the entire length of the said loading bellows (3) along its entire longitudinal axis.

As an alternative or in addition to this, it is possible to achieve a substantially horizontal and/or transverse shaking, knocking or vibrating thrust movement of the walls of the said loading bellows (3).

It is preferably possible to activate the one or more drive elements (6, 8), whose purpose is to stretch the walls of the loading bellows (3) at least partially and/or in sections and/or to exert a substantially horizontal and/or transverse shaking, knocking or vibrating thrust motion on the said loading bellows (3) or the telescopic tube (13), permanently or temporarily, especially at the end of the loading, once or several times one after another by forming a shaking, knocking or vibrating movement.

The loading bellows (3) takes the form for example substantially of an expansion bellows, a spiral hose or a hose. The said loading bellows (3) is preferably made substantially of plastic, metal, fabric or combinations of the same.

The contact area of the loading nozzle (2) that can be brought to connect with the loading opening usually takes the form substantially of a cone, a plate, a ring or a cylinder and is equipped in particularly preferable embodiments with an at least partially surrounding, inflatable seal collar (9).

To summarize, it can be stated that, by virtue of the inflatable seal collar (9), the loader according to the invention is free of the problem of any dust emission from the nozzle clearance area between the loading opening of the container (1) and the cylindrical section of the loading nozzle (2).

In addition, the loader according to the invention—in particular by virtue of the device (5) for stretching the loading bellows—enables the loading fittings, especially the side pleats of the loading bellows, to be dedusted practically entirely, so as to leave no bulk material residues, with a simple construction and in an economic manner.

What is claimed is:

1. A loader for filling tank-shaped containers (1) with bulk material, comprising at least:
   a loading nozzle (2) with one or more outlet openings
   at least one loading bellow (3) in one piece or several pieces connecting directly or indirectly to the loading nozzle (2)
   at least one adjustment element (4) in one piece or several pieces for adjusting the loading nozzle (2) substantially in the horizontal and/or vertical and/or transverse directions, wherein a contact area of the loading nozzle (2) that can be brought to connect directly or indirectly with the container opening takes the form substantially of a pneumatically or hydraulically inflatable seal collar (9) and the loading bellows (3) is connected directly or indirectly with at least one device (5) in one piece or several pieces, for the purpose of stretching the walls of the said loading bellows (3) at least partially and/or at least in sections, whereby the said loader includes a filter unit (12) for filtering the gaseous medium forced out of the said tank-shaped container (1) through the bulk material and includes an outgoing air recirculation system (16) for recirculating the gaseous medium forced out of the said tank-shaped container (1) through the bulk material into a silo (17) being emptied; wherein the device (5), which has the purpose of stretching the walls of the loading bellows (3) at least partially and/or at least in sections, includes, in addition to the at least one drive element (6), for receiving a vibration movement of the said drive element (6), one or more fixture elements (7) in, at or on at least one section of the said loading bellows (3), whereby this at least one said fixture element (7) is a fixture frame substantially adapted to the peripheral shape of the said loading bellows (3), a bracket, a substantially hole-shaped opening, a rope guide eyelet applied to a ring-shaped tube reinforcement or a combination of these.

2. The loader according to claim 1, wherein inside the loading bellows (3), provision is made for at least one bulk material feed tube (10) and that at least one filter unit (12) formed in one piece or several pieces for filtering the gaseous medium forced out of the said tank-shaped container (1) through the bulk material is arrayed in the substantially concentric nozzle clearance area (11) between the said loading bellows (3) and the said bulk material feed tube (10).

3. The loader according to claim 1, wherein the gaseous medium containing dust forced out of the tank-shaped container (1) through the loaded bulk material arrives first in the gap between the outer side of the filter unit (12) and the inner side of the loading bellows (3) or between the inner side of the said filter unit (12) and the outer side of the said bulk material feed tube (10), before subsequently passing through the said filter unit (12) and then flowing cleaned through the gap between the inner side of the said filter unit (12) and the outer side of the said bulk material feed tube (10) or between the outer side of the said filter unit (12) and the inner side of the said loading bellows (3) into the atmosphere, with or without the assistance of suction.

4. The loader according to claim 1, wherein the filter unit (12) is provided for in the upper section of the loading bellows (3) and is shaped with the rigid or flexible form of one or more filter cartridges, rigid filtering tubes or flexible filtering hoses, whereby the said loading bellows (3) has the same diameter along its entire height or is tapered towards the top and/or the bottom.

5. The loader according to claim 1, wherein the filter unit (12) can be dedusted using a dedusting unit by means of vibrating or pneumatically using the parallel flow or counterflow principle.

6. The loader according to claim 1, wherein the height of the loading bellows (3) in retracted condition is substantially equivalent to the height of the filter unit (12).

7. The loader according to claim 1 wherein the contact area of the loading nozzle (2) that can be brought to connect with the container opening takes the form substantially of a cone, a plate, a ring or a cylinder and includes a hydraulically or pneumatically inflatable seal collar (9), whereby the said seal collar (9), whose purpose is to effect a dust-tight and/or gas-tight closure of the gap between the loading nozzle (2) and the loading opening of the tank-shaped container (1), consists substantially of an elastic, reversibly inflatable hose, which surrounds the outer side of the said loading nozzle (2) at least partially and has an external diameter in the deflated condition that is at least somewhat smaller than the diameter of the said loading opening of the said tank-shaped container (1), while its external diameter in the inflated condition is substantially at least equivalent to the diameter of the said loading opening.

8. The loader according to claim 1, wherein is impermeable to air and/or gas with regard to the atmosphere and includes a closed outgoing air recirculation system (16) from the tank-shaped container (1) to be filled to the silo (17) being emptied during the loading process.

9. The loader according to claim 1, wherein the at least one loading bellows (3) in one piece or in several pieces, connecting upstream to the loading nozzle (2), takes the form of a telescopic tube (13) in one piece or several pieces.

10. The loader according to claim 1, wherein the nozzle clearance area(s) (14) between the tubes of the telescopic tube (13) can be sealed by at least one single-piece or multi-piece pneumatically and/or hydraulically inflatable seal collar (15).

11. The loader according to claim 1, wherein one or more drive elements (8) affect substantially horizontally and/or transversely, directly or indirectly, the walls of the loading bellows (3) or of the telescopic loading tube (13), by applying a shaking, knocking or vibrating movement, at least in sections.

12. The loader according to claim 1, wherein the device (5), which has the purpose of stretching the walls of the loading bellows (3) at least partially and/or at least in sections, includes at least one drive element (6), which directly or indirectly affects one or more sections of the wall of the said loading bellows (3) by reversibly thrusting this section along the longitudinal axis of the said loading bellows (3) and/or transversally and/or perpendicular to the same.

13. The loader according to claim 1 wherein the device (5), which has the purpose of stretching the walls of the loading bellows (3) at least partially and/or at least in sections, includes, in addition to the at least one drive element (6), for receiving a vibration movement of the said drive element (6), one or more fixture elements (7) in, at or on at least one section of the said loading bellows (3), whereby this at least one said fixture element (7) is a fixture frame substantially adapted to the peripheral shape of the said loading bellows (3), a bracket, a substantially hole-shaped opening, a rope guide eyelet applied to a ring-shaped tube reinforcement or a combination of these.

14. The loader according to claim 1, wherein the at least one adjustment element (4), whose purpose is to adjust the loading nozzle (2) vertically and/or horizontally and/or transversally, and/or the at least one drive element (6), whose purpose is to stretch the walls of the loading bellows (3) at least partially and/or at least in sections, and/or the drive element (8), whose purpose is to execute a substantially horizontal and/or transverse shaking, knocking or vibrating motion against the walls of the said loading bellows (3) or the telescopic tube (13), takes the form of an hydraulic or pneumatic lifting cylinder, a spring mechanism, a manually and/or electrically powered tackle line mechanism, a rack and pinion or spindle drive, a lifting system, a leverage system or an eccentric wheel, either without or in combination with counterweights, either alone or in combination with each other.

15. The loader according to claim 1 wherein provision is made for one or more fixture elements (7), whose purpose is to receive the movements of at least one drive element (6, 8) in the lower and/or central and/or upper area of the loading bellows (3), so that it is possible to stretch the said loading bellows (3) in sections and/or along the entire length of the said loading bellows (3) along its entire longitudinal axis and/or it is possible to achieve a substantially horizontal and/or transverse shaking, knocking or vibrating thrust movement of the walls of the said loading bellows (3).

16. The loader according to claim 1, wherein it is possible to activate the one or more drive elements (6, 8), whose purpose is to stretch the walls of the loading bellows (3) at least partially and/or in sections and/or to exert a substantially horizontal and/or transverse shaking, knocking or vibrating thrust motion on the said loading bellows (3) or the telescopic tube (13), permanently or temporarily, especially at the end of the loading, once or several times one after another by forming a shaking, knocking or vibrating movement.

17. The loader according to claim 1, wherein the loading bellows (3) takes the form substantially of an expansion bellows, a spiral hose or a hose, whereby the said loading bellows (3) is preferably made substantially of plastic, metal, fabric or combinations of the same.

\* \* \* \* \*